ns Patent [19]

Tachibana et al.

Patent Number: 5,098,822

Date of Patent: Mar. 24, 1992

[54] ANTISTATIC LAYER CONTAINING HYDROPHOBIC POLYMER PARTICLES AND CONDUCTIVE POLYMER

[75] Inventors: Noriki Tachibana; Yoichi Saito, both of Tokyo, Japan

[73] Assignee: Konica Corporation, Tokyo, Japan

[21] Appl. No.: 624,701

[22] Filed: Dec. 6, 1990

[30] Foreign Application Priority Data

Dec. 13, 1989 [JP] Japan ................................. 1-323607

[51] Int. Cl.$^5$ .............................................. G03C 1/82
[52] U.S. Cl. .................................... 430/527; 430/528; 430/529; 525/108; 525/54.24
[58] Field of Search ..................... 430/528, 527, 529; 525/108, 54.25

[56] References Cited

U.S. PATENT DOCUMENTS

| 3,091,537 | 5/1963 | Burneys | 430/624 |
| 4,301,240 | 11/1981 | Bruck et al. | 430/527 |
| 4,542,095 | 9/1985 | Steklenski et al. | 430/527 |
| 4,701,403 | 10/1987 | Miller | 430/527 |
| 4,859,570 | 8/1989 | Miller | 430/527 |

Primary Examiner—Jack P. Brammer
Attorney, Agent, or Firm—Frishauf, Holtz, Goodman & Woodward

[57] ABSTRACT

Disclosed is an antistatic layer for a plastic film having an antistatic layer comprising a reaction product of a water-soluble conductive polymer, a hydrophobic latex and an epoxy type hardener, characterized in that said hydrophobic latex comprises a hydrophobic polymer having at least one of an alkylene oxide chain and an amide group.

5 Claims, No Drawings

ANTISTATIC LAYER CONTAINING HYDROPHOBIC POLYMER PARTICLES AND CONDUCTIVE POLYMER

BACKGROUND OF THE INVENTION

This invention relates to an antistatic layer for a plastic film, particularly to a light-sensitive silver halide photographic material excellent in antistatic ability.

Generally speaking, plastic films have strong chargeability, which gives many restrictions in uses in many examples. For example, in light-sensitive silver halide photographic materials, supports such as polyethylene terephthalate have been generally used, which are liable to be charged particularly at lower humidity during winter season. In recent days, when high sensitivity photographic emulsions are coated at high speed, or light-sensitive materials of high sensitivity are subjected to exposure treatment through an automatic printer, antistatic countermeasures are particularly important.

When a light-sensitive material is charged, static marks may appear by its discharging, or foreign matter such as dust may be attached, whereby pinholes may be generated to deteriorate quality markedly and workability is lowered extremely for correction thereof. For this reason, anti-static agents have been generally used in light-sensitive materials, and recently, fluorine-containing surfactants, cationic surfactants, amphoteric surfactants, surfactants or polymeric compounds containing polyethylene oxide groups, polymers containing sulfonic acid or phosphoric acid groups in the molecule have been employed.

Particularly, chargeability control with a fluorine-containing surfactant or conductivity improvement with a conductive polymer has been frequently used and, for example, in Japanese Unexamined Patent Publications No. 91165/-1974 and No. 121523/1974, examples of applying an ion type polymer having dissociable group in the polymer main chain are disclosed.

However, in these prior art techniques, the antistatic ability will be deteriorated to a great extent by developing processing. This may be considered to be due to the fact that the antistatic ability is lost via the steps such as the developing step using an alkali, the acidic fixing step and the step of washing. Therefore, in the case when printing is conducted by further using a treated film as in a printing light-sensitive material, the problems such as pinhole generation by attachment of dust will ensue. For this reason, for example, in Japanese Unexamined Patent Publications No. 84658/1980 and No. 174542/1986, antistatic layers comprising a water-soluble conductive polymer having carboxyl groups, a hydrophobic polymer having carboxyl groups and a polyfunctional aziridine have been proposed. According to this method, antistatic ability can remain after the treatment, but since transparency of the coated film depends greatly on the drying speed, there was involved the drawback that transparency was lowered to a level which could not stand use at all when drying was effected quickly for improvement of production efficiency, even though it might be transparent when drying was effected slowly.

SUMMARY OF THE INVENTION

To cope with the problems as described above, an object of the present invention is to provide an antistatic layer for a plastic film excellent in transparency without haze even when dried quickly, and also without deterioration of anti-static ability after processing such as developing processing, and another object of the present invention is to provide a light-sensitive silver halide photographic material excellent in antistatic ability.

The above object of the present invention can be accomplished by an antistatic layer for a plastic film having an antistatic layer containing a water-soluble conductive polymer and particles of a hydrophobic polymer and cured by using a hardener, the improvement wherein said hydrophobic polymer has at least one of an alkylene oxide chain and an amide group and said hardener is an epoxy type hardener.

DESCRIPTION OF THE PREFERRED EMBODIMENTS

In the following, the present invention is explained in more detail.

The water-soluble conductive polymer of the present invention may include polymers having at least one conductive group selected from a sulfonic acid group, a sulfate group, a quaternary ammonium salt, a tertiary ammonium salt and a carboxyl group. The conductive group is required to be 5% by weight or more per one molecule of the polymer. In the present specification, "water-soluble" means the case where a material is dissolved in water with an amount of 0.5% by weight or more. In the water-soluble conductive polymer, at least one of a hydroxy group, an amino group, an epoxy group, an aziridine group, an active methylene group, a sulfinic acid group, an aldehyde group and a vinylsulfone group may be preferably contained in order to improve adhesion of the antistatic layer with a layer thereon.

The polymer may have a molecular weight (Mn, a number average molecular weight) of 3,000 to 100,000, preferably 3,500 to 50,000.

In the following, exemplary compounds of the water-soluble conductive polymers to be used in the present invention are set forth, but the present invention is not limited by these examples at all.

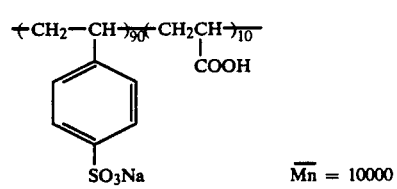

$\overline{Mn} = 10000$

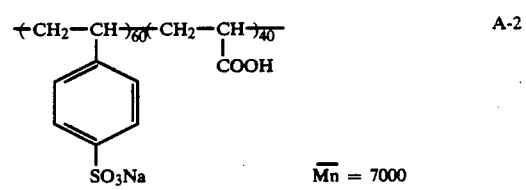

$\overline{Mn} = 7000$

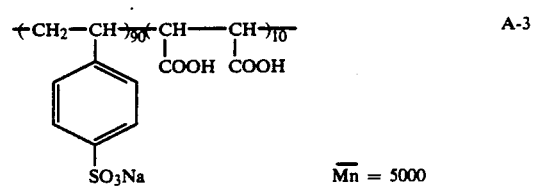

$\overline{Mn} = 5000$

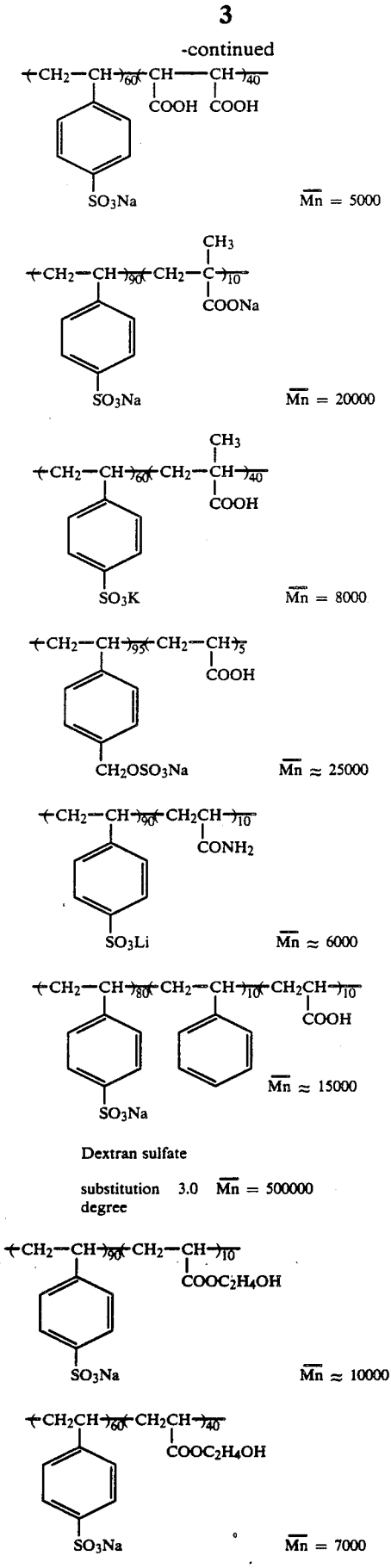
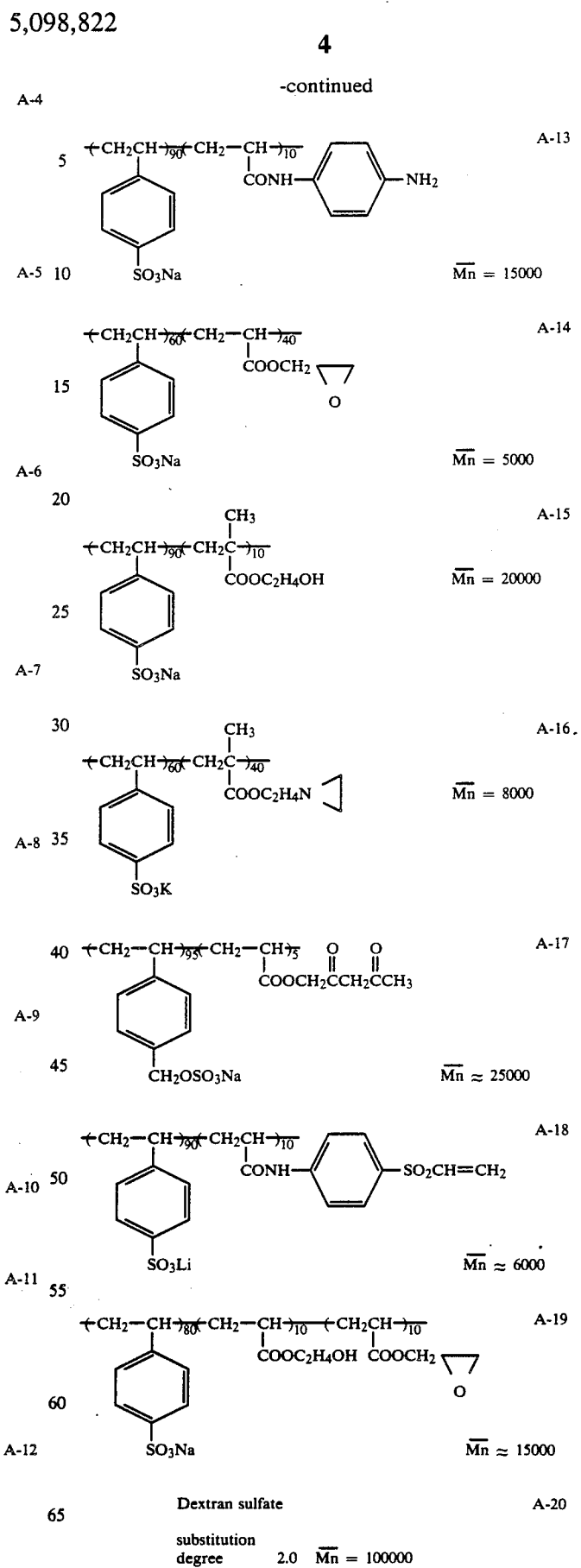

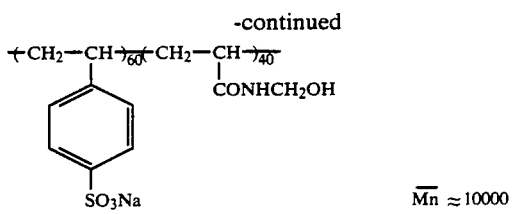

A-21

$\overline{Mn} \approx 10000$

In the above formulae A-1 to A-21, Mn represents an average molecular weight (in the present specification, average molecular weight refers to number average molecular weight), which is a measured value according to GPC represented by polyethylene glycol.

The hydrophobic polymer particles to be contained in the antistatic layer of the present invention are composed of the so-called latex substantially insoluble in water. The hydrophobic polymer can be obtained by polymerization of monomers according to any desired combination selected from among styrene, styrene derivatives, alkyl acrylates, alkyl methacrylates, olefin derivatives, halogenated ethylene derivatives, vinyl ester derivatives and acrylonitrile. Particularly, those containing 30 mole % or more of styrene derivatives, alkyl acrylates and alkyl methacrylates are preferred, particularly preferably 50 mole % to 100 mole %.

As the monomer having an amide group to be contained in the hydrophobic polymer particles of the present invention, those represented by the following formula (I) are preferred.

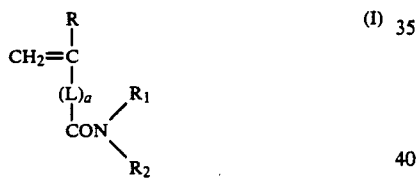

(I)

wherein R represents a hydrogen atom or a lower alkyl group having 1 to 4 carbon atoms; L represents a divalent group; a represents 0 or 1; and $R_1$ and $R_2$ each represent a hydrogen atom or a lower alkyl group having 1 to 6 carbon atoms.

In the following, specific examples of the monomer of the present invention are enumerated.

1. $CH_2=CH$
   $|$
   $CONH_2$

2. $CH_2=C(CH_3)$
   $|$
   $CONH_2$

3. $CH_2=CH$
   $|$
   $CONHCH_3$

4. 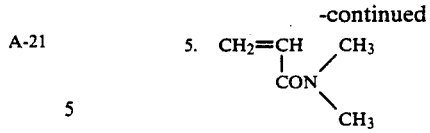

5. 

As the method for introducing a polyalkylene oxide chain into the hydrophobic polymer particles of the present invention, it is preferable to use the method comprising copolymerization with a monomer having an alkylene oxide chain.

As the monomer having a polyalkylene oxide chain to be introduced into the hydrophobic polymer particles of the present invention, those represented by the following formula (M) are preferred.

(M)

wherein R represents a hydrogen atom, a halogen atom, a lower alkyl group or $-CH_2-L-X$; L represent a divalent group such as a group of $-COO-$ or

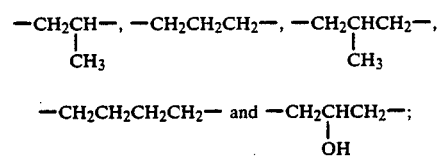

or an arylene group having 6 to 12 carbon atoms; $R_1$ represents a hydrogen atom, an aryl group or a lower alkyl group; X represents $-(R_2-O)_n-R_3$ where $R_2$ is at least one selected from $-CH_2CH_2-$, $-CH_2CH(CH_3)-$, $-CH_2CH_2CH_2-$, $-CH_2CH(CH_3)CH_2-$, $-CH_2CH_2CH_2CH_2-$ and $-CH_2CH(OH)CH_2-$;

$R_3$ represents a hydrogen atom, a lower alkyl group, an alkylsulfonic acid group or its salt, or an alkylcarboxylic acid group or its salt; and n is an integer of not less than 2 and not more than 70.

In the following, specific examples of these monomers are shown.

M-1
$CH_2=CH$
$|$
$COO(CH_2CH_2O)_2H$

M-2
$CH_2=CH$
$|$
$COO(CH_2CH_2O)_4H$

M-3
$CH_2=CH$
$|$
$COO(CH_2CH_2O)_{10}H$

M-4
$CH_2=CH$
$|$
$COO(CH_2CH_2O)_{20}H$

M-5
$CH_2=C(CH_3)$
$|$
$COO(CH_2CH_2O)_5H$

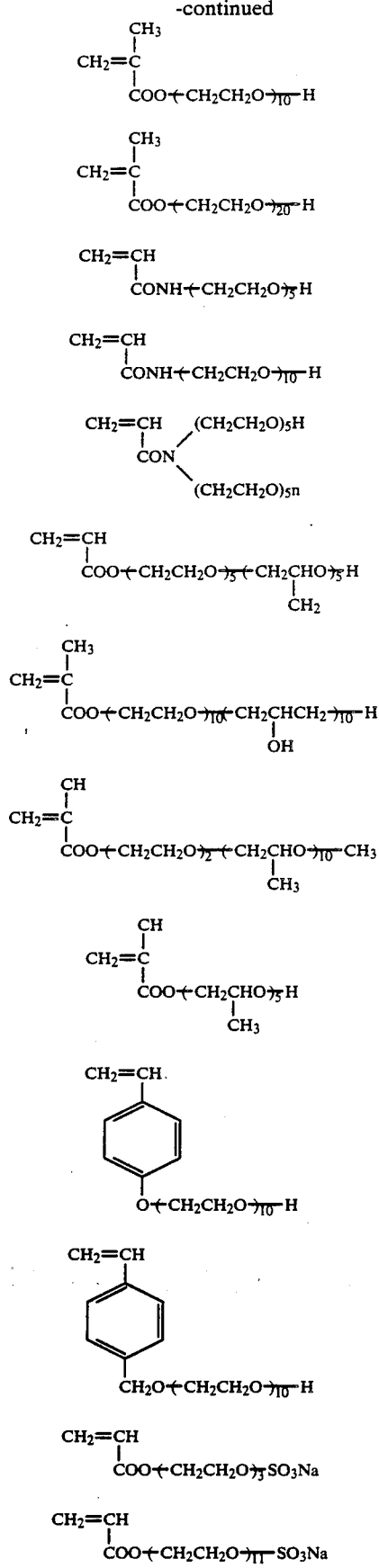

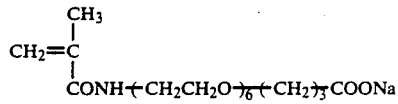

M-31

For making the hydrophobic polymer into the form of a latex, there are two methods, one of which is performing emulsion polymerization and the other is dissolving the polymer in solid state into a low boiling point solvent to be finely dispersed therein, followed by evaporation of the solvent, but the emulsion polymerization method is preferred in the points of fine particle size, and yet with regular sizes.

The number average molecular weight of the hydrophobic polymer may be 3,000 or higher, and there is no substantial difference in transparency depending on the molecular weight.

In the following, specific examples of the latex of the present invention are set forth.

B-1

B-2

B-3

B-4

B-5

B-6

B-7

B-8

B-9

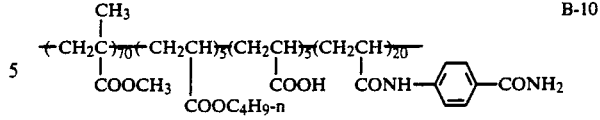 B-10

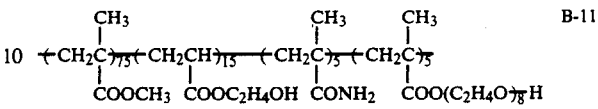 B-11

B-12

B-13

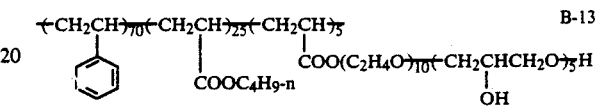 B-14

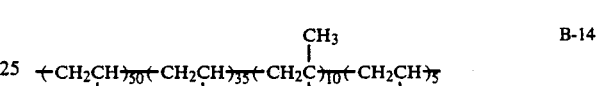 B-15

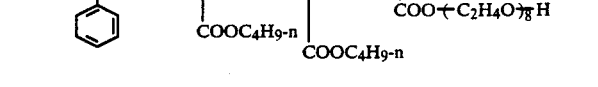 B-16

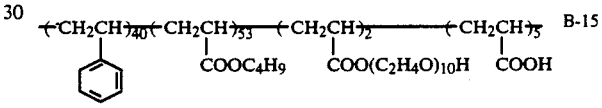 B-17

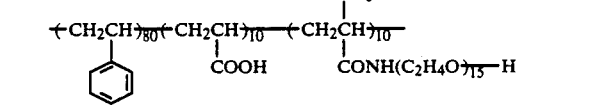 B-18

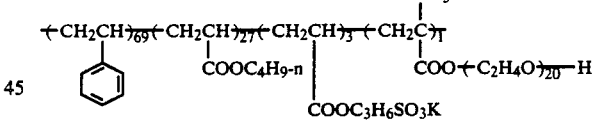 B-19

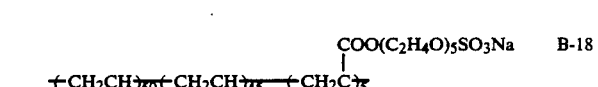 B-20

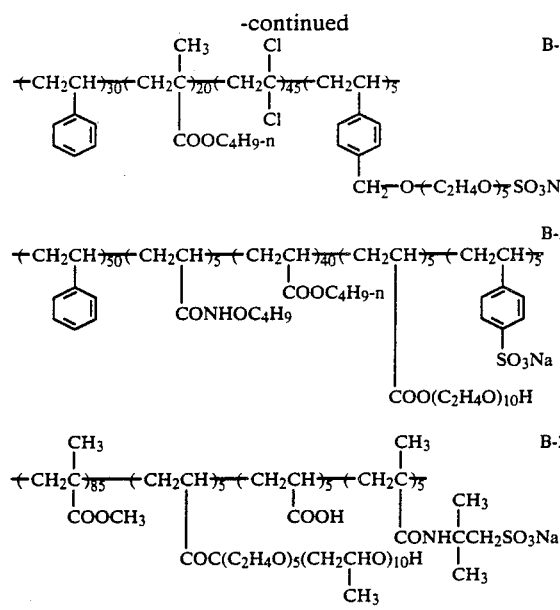
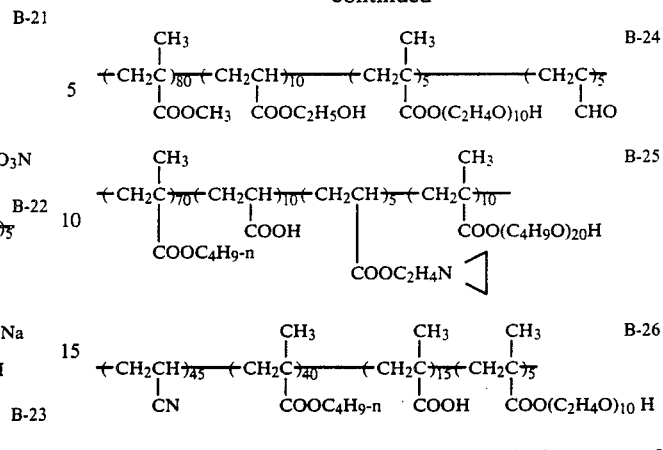
As the epoxy compound to be used as the hardener of the present invention, preferred are those containing a hydroxy group or an ether bond.
Specific examples of the epoxy compound of the present invention are shown below.
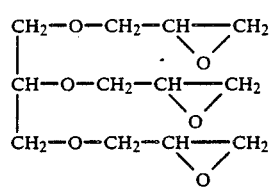
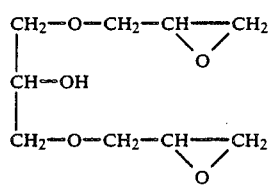
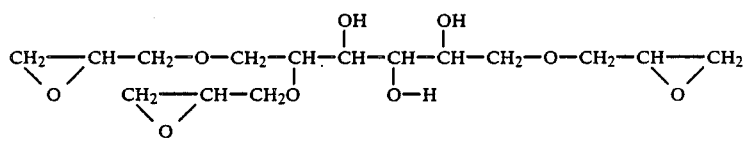
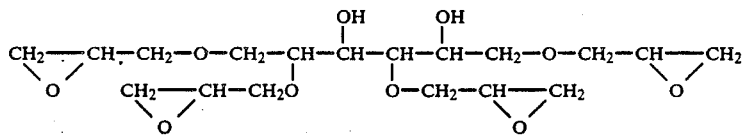
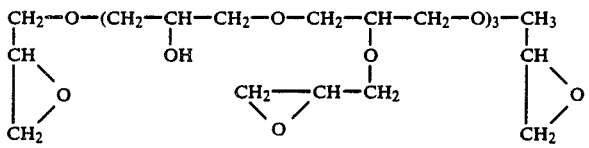
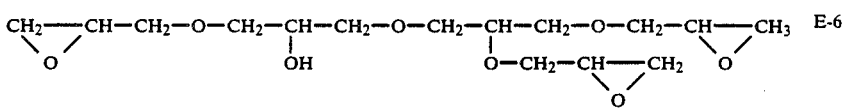

-continued

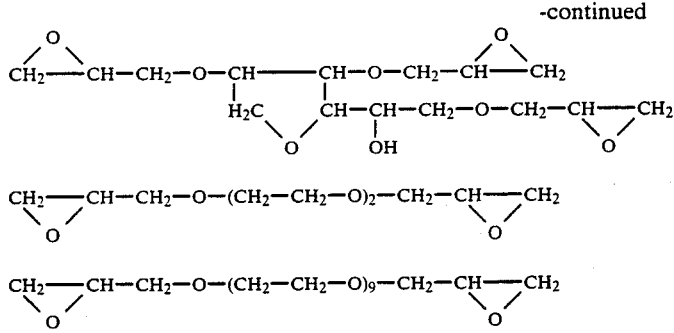

E-7

$$CH_2\text{---}CH\text{---}CH_2\text{---}O\text{---}(CH_2\text{---}CH_2\text{---}O)_2\text{---}CH_2\text{---}CH\text{---}CH_2 \quad \text{E-8}$$
(with terminal epoxides)

$$CH_2\text{---}CH\text{---}CH_2\text{---}O\text{---}(CH_2\text{---}CH_2\text{---}O)_9\text{---}CH_2\text{---}CH\text{---}CH_2 \quad \text{E-9}$$
(with terminal epoxides)

Amounts of the water-soluble conductive polymer, the hydrophobic polymer particles and the epoxy compound to be used as the hardener of the present invention are preferably in the mixing ratio (% by weight) of 40 to 95%: 5 to 50%: 1 to 45%, more preferably 50 to 90%: 10 to 45%: 5 to 30%, particularly preferably 60 to 90%: 10 to 40%: 5 to 30%.

A film thickness of the antistatic layer of the present invention is preferably in dried state 0.4 to 2.5 μm, particularly preferably 0.5 to 2.0 μm. If it is less than 0.4 μm, sufficient conductivity during developing processing can hardly be obtained, while it exceeds 2.5 μm, production of plain surface film can be difficultly obtained since coating processing is difficult.

The pH of the film surface of the antistatic layer of the present invention is preferably 8.0 or less, but too low pH value is not preferred in the point of stability of the film. The pH of 3.0 to 7.5 is particularly preferred. The pH of the film surface can be measured by spotting a solution on the surface of the film, i.e. placing a drop(s) of a solution and adhering a pH electrode to the surface to conduct the measurement.

The antistatic layer of the present invention may be on the support side relative to the light-sensitive layer, or on the side opposite to the light-sensitive layer of the support, namely the back surface.

In the present invention, the antistatic layer is provided on a plastic film support by coating. As the plastic film support, all supports for photography can be used, but preferably transparent polyethylene terephthalate or cellulose triacetate prepared, particularly preferably those so as to transmit 90% or more of visible light.

These transparent plastic film supports can be prepared by the methods well known to those skilled in the art, but in some cases, a dye may be slightly added to give slight blue tint substantially without interfering with light transmission.

The plastic film support of the present invention may also have a subbing layer containing a latex polymer provided by coating after corona discharging treatment. The corona discharging treatment may be applied particularly preferably at 1 mW to 1 KW/m².min as the energy value. Also, particularly preferably, corona discharging treatment is effected again before coating of the antistatic layer after coating of the latex subbing layer.

The present invention can be applied to substantially all light-sensitive materials formed on a plastic film support. For example, they are light-sensitive silver halide color materials, light-sensitive materials for roentgenogram and light-sensitive materials for printing plates.

In the light-sensitive silver halide photographic material according to the present invention and/or the developing solution, an amino compound can be contained.

For enhancing developability, a developing agent such as phenidone or hydroquinone, an inhibitor such as benzotriazole can be contained on the emulsion side. Alternatively, for enhancing the processing ability, a developing agent or an inhibitor can be contained in the backing layer.

The hydrophilic colloid to be used particularly advantageously in the prevent invention is gelatin.

The gelatin to be used in the present invention may include both of alkali treated and acid treated gelatins. However, when osscein gelatin is used, it is preferred to remove calcium or iron. The content of calcium may be preferably 1 to 2000 ppm, more preferably 1 to 1500 ppm, and the content of iron may be preferably 0.01 to 50 ppm, more preferably 0.1 to 10 ppm. A method for thus controlling the amount of calcium or iron can be accomplished by passing an aqueous gelatin solution through an ion exchange device.

The developing agent to be used for development of the light-sensitive silver halide photographic material according to the present invention may include catechol, pyrogallol and derivatives thereof, and ascorbic acid, chlorohydroquinone, bromohydroquinone, methylhydroquinone, 2,3-dibromohydroquinone, 2,5-diethylhydroquinone, 4-chlorocatechol, 4-phenyl-catechol, 3-methoxy-catechol, 4-acetylpyrogallol and sodium ascorbate.

Also, HO---(CH=CH)$_n$---NH$_2$ type developer may typically include o- and p-aminophenols, and specifically includes 4-aminophenol, 2-amino-6-phenylphenol, 2-amino-4-chloro-6-phenylphenol and N-methyl-p-aminophenol.

Further, examples of H$_2$N---(CH=CH)$_n$---NH$_2$ type developer may include 4-amino-2-methyl-N,N-diethylaniline, 2,4-diamino-N,N-diethylaniline, N-(4-amino-3-methylphenyl)morpholine and p-phenylenediamine.

Heterocyclic type developer may include 3-pyrazolidones such as 1-phenyl-3-pyrazolidone, 1-phenyl-4,4-dimethyl-3-pyrazolidone and 1-phenyl-4-methyl-4-hydroxymethyl-3-pyrazolidone, and 1-phenyl-4-amino-5-pyrazolone and 5-aminouracil.

In the present invention, there may be effectively used the developers as described in T. H. James, "The Theory of the Photographic Process", Fourth Edition, pp. 291-334 and Journal of the American Chemical Society, Vol. 73, p. 3,100 (1951). These developers can be used either singly or in combination of two or more kinds, but preferably in combination of two or more kinds. Also, in the developing solution to be used for development of the light-sensitive material according to the present invention, for example, sulfites such as sodium sulfite and potassium sulfite can be used as the preservative without impairing the effect of the present invention. Also, as the preservative, hydroxylamine and hydrazide compounds can be used, and in this case, the amount of such compounds used may be preferably 5 to 500 g, more preferably 20 to 200 g per liter of the developing solution.

Also, in the developing solution, glycols may be contained as the organic solvent, and examples of such glycols may include ethylene glycol, diethylene glycol, propylene glycol, triethylene glycol, 1,4-butanediol and 1,5-pentene diol, but diethylene glycol may be preferably used. The amount of these glycols used may be preferably 5 to 500 g, more preferably 20 to 200 g per liter of the developing solution. These organic solvents can be used either alone or in combination.

The light-sensitive silver halide photographic material according to the present invention can give a light-sensitive material extremely excellent in storage stability by performing development processing by use of a developing solution containing a developing inhibitor as described above.

The pH value of the developing solution comprising the above composition may be preferably 9 to 13, but the pH value in the range of 10 to 12 is more preferred in preservability and photographic characteristics. As for the cations in the developing solution, a developer with higher potassium ion ratio than sodium ion is preferred for enhancing the activity of the developing solution.

The light-sensitive silver halide photographic material according to the present invention can be processed according to various conditions. The processing temperature may be preferably a developing temperature of 50° C. or lower, particularly around 25° C. to 40° C., and the development is generally accomplished within 2 minutes, particularly preferably from 10 seconds to 50 seconds to bring about preferred effects in many cases. Also, other processing steps than developing, for example, washing, stopping, stability and fixing, further, if necessary, pre-film hardening and neutralization can be employed as desired, and these can be also omitted suitably. Further, these treatments may be also the so-called manual development processing such as dish development and frame development, or mechanical development such as roller development and hanger development.

The present invention is described in detail by referring to Examples. As a matter of course, the present invention is not limited by Examples as described below at all.

EXAMPLE 1

On a biaxial stretched polyethylene terephthalate support applied to subbing treatment after corona discharging and having a thickness of 100 μm, followed further by corona discharging were coated an antistatic solution having the composition shown below added an epoxy type hardener (E) shown in Table 1 by using an air knife coater at a speed of 50 m/min so as to become 10 m/m².

| Water-soluble conductive polymer (A) | 60 g/l |
|---|---|
| Hydrophobic polymer particle (B) | 40 g/l |
| Ammonium sulfate | 0.5 g/l |
| Hardener (E) shown in Table 1 | 12 g/l |

The solution having the above composition was made up to 1 liter.

The coating was dried under the parallel stream conditions of a drying air temperature of 90° C., an overall heat transfer coefficient of 25 Kg/m².hr. °C. for 30 seconds, followed further by heat treatment at 140° C. for 90 seconds to obtain a thickness of 1.0 μm. On the antistatic layer, gelatin was coated to 2.0 g/m², and dried. As the hardener of gelatin, (H) shown below was employed.

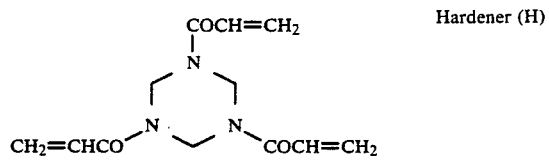

Hardener (H)

Haze test was conducted according to the method as described below, and the results are shown in Table 1.

Haze Test

By means of a turbidimeter Model T-2600 DA manufactured by Tokyo Denshoku K. K., the film support was measured and the transmittance was represented in %.

TABLE 1

|  | (A) | (B) | (E) | Transmittance (%) |
|---|---|---|---|---|
| This invention | 4 | 3 | 1 | 95 |
| This invention | 4 | 4 | 1 | 95 |
| This invention | 4 | 10 | 2 | 95 |
| This invention | 4 | 6 | 5 | 95 |
| This invention | 13 | 6 | 5 | 93 |
| This invention | 16 | 11 | 5 | 92 |
| This invention | 4 | 11 | 1 | 95 |
| This invention | 4 | 15 | 2 | 95 |
| This invention | 4 | 9 | 8 | 95 |
| This invention | 4 | 14 | 5 | 96 |
| This invention*1 | 4 | 5 | 5 | 91 |
| This invention*2 | 4 | 5 | 5 | 91 |
| Comparative*3 | 4 | (a) | 5 | 80 |
| Comparative*4 | 4 | 5 | (b) | 80 |

*1: (A):(B):(E) (weight) = 70 g:30 g:12 g
*2: (A):(B):(E) (weight) = 55 g:45 g:12 g
*3: Formula (a)

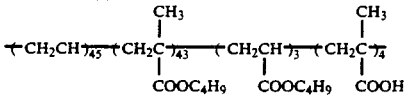

Compound described in Japanese Unexamined Patent Publication No. 84658/1980, Mn = 5,000
*4: As the hardener, azirydine compound described in Japanese Unexamined Patent Publication No. 84658/1980:

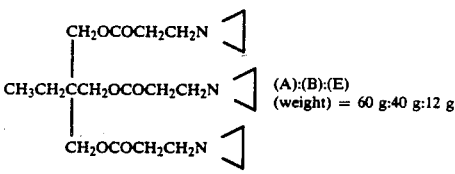

(A):(B):(E) (weight) = 60 g:40 g:12 g

From the results in Table 1, it can be understood that the samples of the present invention are excellent in haze.

EXAMPLE 2

Under acidic atmosphere of pH 3.0, particles containing $10^{-5}$ mole of rhodium per one mole of silver were prepared according to the control double jet method. The particles were grown in a system containing 30 mg of benzyladenine per one liter of a 1% aqueous gelatin solution. After mixing of silver and a halide, 600 mg of 6-methyl-4-hydroxy-1,3,3a,7-tetrazaindene was added per 1 mole of silver halide, followed by washing and desalting.

Subsequently, 60 mg of 6-methyl-4-hydroxy-1,3,3a,7-tetrazaindene was added per one mole of silver halide, followed by sulfur sensitization. After sulfur sensitization, 6-methyl-4-hydroxy-1,3,-3a,7-tetrazaindene was added as a stabilizer.

Silver Halide Emulsion Layer

To the above respective emulsions, the following additives were added by controlling the attached amounts to those shown below, and each mixture was coated on a polyethylene terephthalate support (thickness: 100 μm) subjected to subbing treatment using poly(styrene-butyl acrylateglycidyl methacrylate) latex.

| | |
|---|---|
| Latex polymer: styrene - butyl acrylate - acrylic acid terpolymer | 1.0 g/m$^2$ |
| Tetraphenylphosphonium chloride | 30 mg/m$^2$ |
| Saponin | 200 mg/m$^2$ |
| Polyethylene glycol | 100 mg/m$^2$ |
| Sodium dodecylbenzenesulfonate | 100 mg/m$^2$ |
| Hydroquinone | 200 mg/m$^2$ |
| Phenidone | 100 mg/m$^2$ |
| Sodium styrenesulfonate-maleic acid copolymer (Mw = 250,000) | 200 mg/m$^2$ |
| Butyl gallate | 500 mg/m$^2$ |
| Tetrazolium compound shown below | 20 mg/m$^2$ |
| 5-Methylbenzotriazole | 30 mg/m$^2$ |
| 2-Mercaptobenzimidazole-5-sulfonic acid | 30 mg/m$^2$ |
| Inert osscein gelatin (isoelectric point 4.9) | 1.5 mg/m$^2$ |
| 1-(p-Acetylamidophenyl)-5-mercaptotetrazole | 30 mg/m$^2$ |
| Silver quantity | 2.8 g/m$^2$ |

Tetrazolium Compound

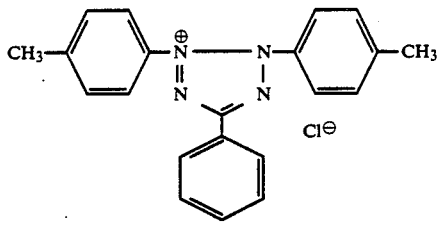

Emulsion Layer Protective Film

As the emulsion layer protective film, the composition was prepared and coated to the attached amounts shown below.

| | |
|---|---|
| Fluorinated dioctylsulfosuccinic acid ester | 300 mg/m$^2$ |
| Matte agent: polymethyl methacrylate (average particle size 3.5 μm) | 100 mg/m$^2$ |
| Lithium nitrate | 30 mg/m$^2$ |
| Acid-treated gelatin (isoelectric point 7.0) | 1.2 g/m$^2$ |
| Colloidal silica | 50 mg/m$^2$ |
| Sodium styrenesulfonate-maleic acid copolymer | 100 mg/m$^2$ |

Mordant

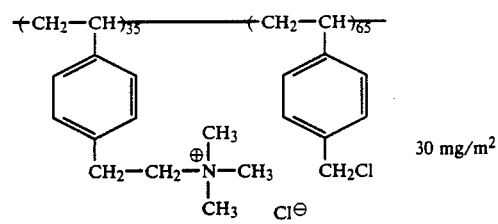

30 mg/m$^2$

Dye

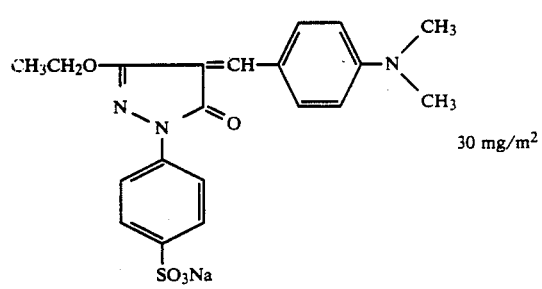

30 mg/m$^2$

Backing Layer

On the support opposite to the emulsion layer, after corona discharging with a power of 30 W/m$^2$.min previously, a poly(styrene-butyl acrylate-glycidyl methacrylate) latex copolymer was coated in the presence of hexamethyleneaziridine hardener, and further the antistatic layer of the present invention was provided by coating thereon in the same manner as in Example 1. Subsequently, a backing layer containing a backing dye having the composition shown below was coated on the layer. The gelatin layer was hardened with glyoxal, 1-oxy-3,5-dichloro-S-traizine sodium salt and E-5 which is a hydroxy-containing epoxy compound.

Backing Layer

| | |
|---|---|
| Hydroquinone | 100 mg/m$^2$ |
| Phenidone | 30 mg/m$^2$ |
| Latex polymer: butyl acrylate-styrene copolymer | 0.5 g/m$^2$ |
| Styrene-maleic acid copolymer | 100 mg/m$^2$ |
| Citric acid | 40 mg/m$^2$ |
| Benzotriazole | 100 mg/m$^2$ |
| Styrenesulfonic acid-maleic acid copolymer | 100 mg/m$^2$ |
| Lithium nitrate | 30 mg/m$^2$ |
| Backing dyes (a), (b) and (c) shown below | |

-continued

| | |
|---|---|
| Osccein gelatin | 2.0 g/m² |

(a)
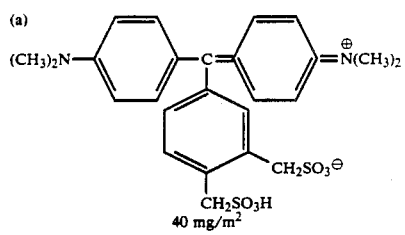
40 mg/m²

(b)
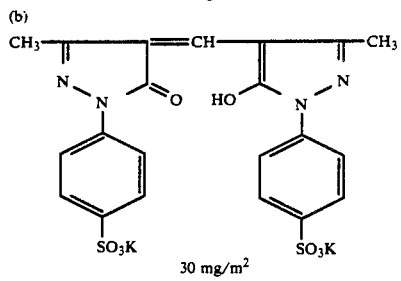
30 mg/m²

(c)
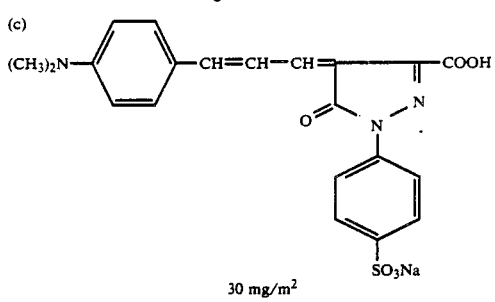
30 mg/m²

The sample obtained as described above were subjected to whole surface exposure, and developed by using the developing solution and the fixing solution shown below, followed by surface specific resistance test and haze test.

Developing Solution Recipe

| | |
|---|---|
| Hydroquinone | 25 g |
| 1-Phenyl-4,4-dimethyl-3-pyrazolidone | 0.4 g |
| Sodium bromide | 3 g |
| 5-Methylbenzotriazole | 0.3 g |
| 5-Nitroindazole | 0.05 g |
| Diethylaminopropane-1,2-diol | 10 g |
| Potassium sulfite | 90 g |
| Sodium 5-sulfosalicylate | 75 g |
| Sodium ethylenediaminetetraacetate | 2 g |
| (made up to one liter with water, and adjusted to pH 11.5 with caustic soda) | |

Fixing Solution Recipe

Composition A

| | |
|---|---|
| Ammonium thiosulfate (72.5% by weight aqueous solution) | 240 ml |
| Sodium sulfite | 17 g |
| Sodium acetate · trihydrate | 6.5 g |
| Boric acid | 6 g |
| Sodium citrate · dihydrate | 2 g |
| Acetic acid (90% by weight aqueous solution) | 13.6 ml |

Composition B

| | |
|---|---|
| Pure water (deionized water) | 17 ml |
| Sulfuric acid (50% by weight aqueous solution) | 3.0 g |
| Aluminum sulfate (aqueous solution containing 8.1% by weight content calculated on Al₂O₃) | 20 g |

During use of the fixing solution, the above composition A and the composition B were successively dissolved in 500 ml of water in this order, and made up to one liter before use. The fixing solution had a pH of about 5.6.

Developing Processing Conditions

| (Step) | (Temperature) | (Time) |
|---|---|---|
| Developing | 40° C. | 8 sec |
| Fixing | 35° C. | 8 sec |
| Washing | Normal temperature | 10 sec |

Haze and surface specific resistance were measured, and the results are shown in Table 2.

The surface specific resistance was measured at 23° C. under 55% RH (relative humidity) by using a teraohmmeter Model VE-30 manufactured by Kawaguchi Denki K. K.

TABLE 2

| Sample | | (A) | (B) | (E) | Transmittance (%) | Surface specific resistance (Ω) |
|---|---|---|---|---|---|---|
| 1 | This invention | 4 | 3 | 1 | 95 | $5 \times 10^{11}$ |
| 2 | This invention | 4 | 4 | 1 | 93 | $6 \times 10^{11}$ |
| 3 | This invention | 4 | 10 | 2 | 93 | $5 \times 10^{11}$ |
| 4 | This invention | 13 | 6 | 5 | 96 | $5 \times 10^{11}$ |
| 5 | This invention | 16 | 6 | 5 | 95 | $3 \times 10^{11}$ |
| 6 | This invention | 4 | 11 | 5 | 93 | $5 \times 10^{11}$ |
| 7 | This invention | 4 | 11 | 1 | 95 | $5 \times 10^{11}$ |
| 8 | This invention | 4 | 15 | 2 | 95 | $6 \times 10^{11}$ |
| 9 | This invention | 4 | 9 | 8 | 93 | $6 \times 10^{11}$ |
| 10 | This invention | 4 | 14 | 5 | 96 | $5 \times 10^{11}$ |
| 11 | This invention*1 | 4 | 5 | 5 | 92 | $5 \times 10^{11}$ |
| 12 | This invention*2 | 4 | 5 | 5 | 92 | $5 \times 10^{11}$ |
| 13 | Comparative*3 | 4 | (a) | 5 | 79 | $6 \times 10^{11}$ |
| 14 | Comparative*4 | 4 | 5 | (b) | 81 | $2 \times 10^{11}$ |

*1(A):(B):(E) (weight) = 70 g:30 g:12 g
*2(A):(B):(E) (weight) = 55 g:45 g:12 g
*3The compound of the formula (a) is the same as in Example 1.
*4The hardener of the formula (b) is the same as in Example 1, and (A):(B):(E) (weight) = 60 g:40 g:12 g.

From the results in Table 2, according to the present invention, it can be understood that excellent antistatic ability can be maintained even after developing processing and also haze is good.

Also, when the tetrazolium compound in the emulsion layer was replaced with the hydrazine compound shown below, the same effect could be obtained.

Hydrazine Compound

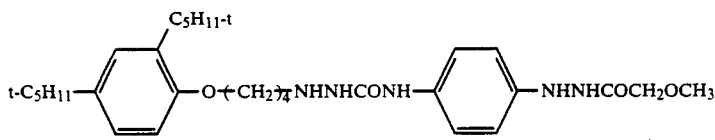

According to the present invention, an excellent antistatic layer of a light-sensitive silver halide photographic material excellent in transparency after coating could be obtained without any deterioration of antistatic ability even after developing processing.

We claim:

1. In an antistatic layer for a plastic film; said antistatic layer consisting essentially of a water-soluble conductive polymer and particles of a hydrophobic polymer and said antistatic layer having been cured by using a hardener, the improvement wherein said hydrophobic polymer is a polymer obtained by copolymerization at least one of a monomer having an amide group and a monomer having a polyalkylene oxide chain with a monomer selected from the group consisting of styrene, styrene derivative, alkyl acrylates, alkyl methacrylates, olefin derivatives, halogenated ethylene derivatives, acrylamide derivatives, methacrylamide derivatives, vinyl ester derivatives and acrylonitrile, said monomer having an amide group is represented by the formula (I):

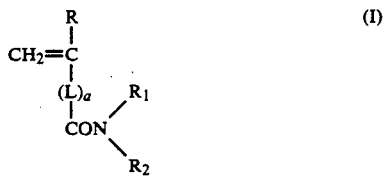

wherein R represents a hydrogen atom or a lower alkyl group having 1 to 4 carbon atoms; L represents a divalent group; a represents 0 or 1; and $R_1$ and $R_2$ each represent a hydrogen atom or a lower alkyl group having 1 to 6 carbon atoms;

said monomer having a polyalkylene oxide chain is represented by the formula (M):

wherein said R represents a hydrogen atom, a halogen atom, a lower alkyl group or —$CH_2$—L—X; L represents a divalent group selected from a group of —COO— and $$-CON- \atop R_1$$

and an arylene group having 6 to 12 carbon atoms; $R_1$ represents a hydrogen atom, an aryl group or a lower alkyl group; X represents —($R_2$—O)$_n$—$R_3$ where $R_2$ is at least one selected from —$CH_2CH_2$—,

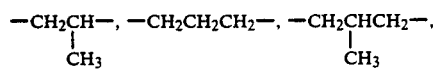

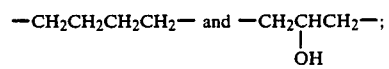

$R_3$ represents a hydrogen atom, a lower alkyl group, an alkylsulfonic acid group or its salt, or an alkylcarboxylic acid group or its salt; and n is an integer of not less than 2 and not more than 70:

wherein said water-soluble conductive polymer has at least one conductive group selected from the group consisting of a sulfonic acid group, a sulfuric acid ester group, a tertiary ammonium salt, a quaternary ammonium salt and a carboxyl group;

wherein said hardener is an epoxy compound; and wherein a ratio of said water-soluble conductive polymer, said particles of hydrophobic polymer and said hardener is 40 to 95 weight %: 5 to 50 weight %: 1 to 45 weight %.

2. The antistatic layer of claim 1, wherein the water-soluble conductive polymer has at least one group selected from the group consisting of hydroxy group, amino group, epoxy group, aziridine group, active methylene group, sulfinic acid group, aldehyde group and vinylsulfone group in an amount of 5% by weight or more per one molecule of the water-soluble conductive polymer.

3. The antistatic layer of claim 1, wherein the water-soluble conductive polymer has a molecular weight of 3,000 to 100,000.

4. The plastic film of claim 1, wherein the epoxy type hardener has a hydroxy group or an ether bond.

5. The antistatic layer of claim 1, having a thickness of 0.4 to 2.5 μm; a ratio of water soluble conductive polymer particles to epoxy compounds of the epoxy type hardener of 40 to 95%: 5 to 50%: 1 to 45%; and wherein the alkylene oxide chain is introduced into the hydrophobic polymer by copolymerization of the hydrophobic polymer with at least one monomer selected from a monomer having the alkylene oxide chain and a monomer having an amide group.

* * * * *